(12) United States Patent
Piasecki

(10) Patent No.: US 11,993,391 B1
(45) Date of Patent: May 28, 2024

(54) APPARATUS, SYSTEM AND METHOD FOR STORAGE OF HYDROGEN ON BOARD A HYDROGEN-FUELED AIRCRAFT

(71) Applicant: Piasecki Aircraft Corporation, Essington, PA (US)

(72) Inventor: Frederick W. Piasecki, Haverford, PA (US)

(73) Assignee: Piasecki Aircraft Corporation, Essington, PA (US)

( * ) Notice: Subject to any disclaimer, the term of this patent is extended or adjusted under 35 U.S.C. 154(b) by 0 days.

(21) Appl. No.: 17/671,201

(22) Filed: Feb. 14, 2022

Related U.S. Application Data

(60) Provisional application No. 63/149,767, filed on Feb. 16, 2021.

(51) Int. Cl.
*B64D 37/04* (2006.01)
*B64C 1/06* (2006.01)
(Continued)

(52) U.S. Cl.
CPC ............ *B64D 37/04* (2013.01); *B64C 1/0685* (2020.01); *B64C 27/04* (2013.01); *B64D 27/24* (2013.01);
(Continued)

(58) Field of Classification Search
CPC ...... B64C 1/0685; B64D 37/04; B64D 37/30; B64D 27/24
See application file for complete search history.

(56) References Cited

U.S. PATENT DOCUMENTS 1,908,212 A * 5/1933 Alfaro ................... B64C 27/027
244/93
6,382,556 B1 * 5/2002 Pham .................. B64C 29/0033
244/6
(Continued)

FOREIGN PATENT DOCUMENTS

| CN | 107719658 A | * | 2/2018 | ............. B64C 27/20 |
| WO | 2012045035 | | 5/2012 | |
| WO | WO-2020079419 A1 | * | 4/2020 | ................ B60L 1/02 |

OTHER PUBLICATIONS

Arturo Gomez and Howard Smith, "Liquid Hydrogen Fuel Tanks for Commercial Aviation: Structural Sizing and Stress Analysis," Aerospace Science and Technology, vol. 95, Dec. 2019, article No. 105438.

*Primary Examiner* — Timothy D Collins
*Assistant Examiner* — Justin Michael Heston
(74) *Attorney, Agent, or Firm* — Robert J. Yarbrough of Lipton, Weinberger & Husick

(57) ABSTRACT

A fixed-wing or rotary-wing aircraft has a tail boom that contains a fuel tank. The fuel tank is configured to contain pressurized hydrogen. The pressurized hydrogen fuels a fuel cell stack to generate electricity to rotate one or more rotors or propellers. The fuel tank may define the structure of the tail boom and may support the empennage, tail rotor, propeller, convertible thruster, ducted fan or vectored thruster and associated drive systems with respect to the fuselage. The aircraft has adequate control authority for sustained coordinated flight when the fuel tank is filled with pressurized hydrogen and when the fuel tank is drained of pressurized hydrogen. The same aircraft may not have adequate control authority for coordinated flight if fuel tank was filled with a conventional liquid fuel.

17 Claims, 6 Drawing Sheets

(51) Int. Cl.
*B64C 27/04* (2006.01)
*B64D 27/24* (2006.01)
*B64D 37/30* (2006.01)
*B64D 41/00* (2006.01)

(52) U.S. Cl.
CPC ........ *B64D 37/30* (2013.01); *B64D 2041/005* (2013.01)

(56) References Cited

U.S. PATENT DOCUMENTS

| | | | |
|---|---|---|---|
| 2003/0230671 | A1 | 12/2003 | Dunn |
| 2004/0195433 | A1* | 10/2004 | Kayama .............. B64C 29/0025 244/10 |
| 2015/0336680 | A1* | 11/2015 | Schumacher ............ F17C 3/00 244/135 B |
| 2018/0261966 | A1* | 9/2018 | Smiley .................... H01S 3/042 |
| 2018/0319283 | A1* | 11/2018 | Battin .................. B60K 15/063 |
| 2020/0223540 | A1* | 7/2020 | Ivans ...................... B64C 27/82 |
| 2020/0239152 | A1* | 7/2020 | Rainville ................ B64C 27/26 |
| 2021/0078719 | A1* | 3/2021 | Thomas ................. B64D 37/08 |
| 2021/0381429 | A1* | 12/2021 | Taylor ...................... F02C 6/00 |

\* cited by examiner

APPARATUS, SYSTEM AND METHOD FOR STORAGE OF HYDROGEN ON BOARD A HYDROGEN-FUELED AIRCRAFT

I. BACKGROUND OF THE INVENTION

A. Field of the Invention

The Invention is an apparatus, system and method to efficiently use space on board an aircraft for the storage of hydrogen fuel.

B. Description of the Related Art

For the purposes of this document, an 'aircraft' is an airborne vehicle of any configuration, including a rotary-wing aircraft and a fixed-wing aircraft. A rotary-wing aircraft includes a helicopter or compound aircraft of any configuration, including without limitation a single rotor, tandem rotor, coaxial rotor, intermeshing rotor, quad rotor, ducted fan, wing-compound aircraft and thrust-compound aircraft. The term 'aircraft' also includes any vehicle capable of flight due to aerodynamic lift in which motive power for flight is on board the aircraft. As used in this document, the term 'tail rotor' includes a propeller mounted to the tail boom of a rotary wing aircraft that balances main rotor torque. The term 'tail rotor' also includes a propeller mounted on the tail boom and that is a pusher propeller, vectored thruster or convertible thruster. As used in this document, a 'convertible thruster' means a tail rotor that rotates between a thrust position, in which the convertible thruster provides forward thrust, and a reaction position in which tail rotor balances main rotor torque.

In a prior art aircraft, the on-board fuel supply is located as close to the center of gravity of the aircraft as possible and symmetrically disposed about the aircraft center of gravity to reduce changes to aircraft trim due to changes in the weight of the fuel acting through the center of gravity of the fuel. For example, a prior art hydrogen-fueled Tupolev Tu155 aircraft stored hydrogen as pressurized hydrogen gas in the fuselage close to the center of gravity of the aircraft.

The prior art does not teach the hydrogen storage system of the Invention.

II. BRIEF DESCRIPTION OF THE INVENTION

A fuel tank for the storage of pressurized hydrogen may be incorporated into the tail boom of an aircraft. The fuel tank in the tail boom extends the flight range or duration of an aircraft with less mass and lighter weight than a similar aircraft with separate tanks for hydrogen storage within the fuselage of the aircraft.

A tail boom may extend in the aft direction from the fuselage of an aircraft or may define the aft-most portion of the fuselage. The tail boom supports the empennage, tail rotor or convertible thruster and transfers control moments to the aircraft. The term 'empennage' means horizontal or vertical stabilizer, stabilator, rudder, elevator, or V-tail. A helicopter or compound aircraft may use a tail boom to support a tail rotor, convertible thruster or propeller that balances the torque of the main rotor(s) or that provides thrust to move the aircraft through the air.

The tail boom has a first end and a second end. The first end may be attached to the fuselage. The second end extends in the aft direction from the first end. The empennage, tail rotor or convertible thruster, along with its associated operating mechanism, is attached to the second end of the tail boom. The operating mechanisms for the empennage, tail rotor or convertible thruster may include control cables, control rods, electrical cables and wires, electrical motors, rotating shafts, pulleys, bell cranks, bearings, microprocessors, and all other apparatus needed to operate the empennage, tail rotor or convertible thruster.

The tail boom includes a fuel tank for pressurized hydrogen. The fuel tank may be a structural element of the tail boom and may structurally support the empennage, tail rotor or convertible thruster. To this end, the fuel tank may define some or all of the outer mold line (OML) of the tail boom. The OML of the tail boom is the outer skin of the tail boom over which ambient air flows when the aircraft is in flight. The fuel tank may define the first end of the tail boom that is attached to the fuselage and may define the second end of the tail boom that supports the empennage, tail rotor or convertible thruster. The operating mechanisms for the empennage, tail rotor or convertible thruster may be supported by the fuel tank and may traverse the length of the tail boom from the first end to the second end. The dual use of the fuel tank for the storage of pressurized hydrogen and as the structural support of the empennage, tail rotor or convertible thruster saves overall aircraft weight. Alternatively, the fuel tank may be one or more discrete tanks located within a separate tail boom. The one or more discrete fuel tanks included within the separate tail boom may provide structural support for the empennage, tail rotor or convertible thruster even if the fuel tanks do not define the OML of the tail boom.

The fuel tank that structurally supports the tail boom or that is located within the tail boom has a fuel tank center of gravity when the fuel tank is filled with fuel. The fuel tank center of gravity may be spaced apart from the aircraft center of lift in a position that would unbalance the aircraft in pitch and render controlled flight impracticable if the fuel tank was filled with a liquid fuel. At some combination of the mass of the conventional liquid fuel and the distance between the aircraft center of lift and the fuel tank center of gravity, the aircraft will not have adequate control authority to overcome the imbalance caused by the weight of the liquid fuel and controlled flight is not possible. The low density and hence light weight of the pressurized hydrogen in the fuel tank avoids this result and makes storage of pressurized hydrogen in the tail boom at a spaced-apart relation to the aircraft center of lift possible and practicable.

Locating conventional liquid fuel in the tail boom, even if possible, would interfere with the pitch trim of the aircraft because the center of gravity of the aircraft changes as the liquid fuel is consumed. Locating conventional liquid fuel in the tail boom also would interfere with the handling characteristics of the aircraft in yaw and pitch due to the relatively large polar moment of inertia of the liquid fuel about the center of gravity of the aircraft. Again, the light weight of the pressurized hydrogen in the fuel tank avoids these results and allows storage of pressurized hydrogen in the tail boom.

The hydrogen may be stored in the fuel tank in a form other than compressed gas—the hydrogen may be stored as a cryogenic liquid or using materials-based hydrogen storage technologies, such as sorbents, metal hydrides and chemical hydrogen storage materials. Where this document refers to pressurized hydrogen and a fuel tank, it refers equally to hydrogen gas, to hydrogen in the form of cryogenic liquid hydrogen, and to hydrogen that is adsorbed onto a sorbent or that is incorporated into a metal hydride or in chemical hydrogen storage and to any structure to support that stored hydrogen in the tail boom of an aircraft.

The invention is useful for electrically-powered aircraft. A fuel cell may utilize hydrogen and an oxidizer, such as oxygen in the atmosphere, to generate electricity. The electricity may drive one or more electric motors. For a rotary wing aircraft, the electric motors may power one or more main rotors to provide aerodynamic lift to the aircraft and also may power a tail rotor, propeller, or convertible thruster to balance the torque of the main rotor(s) or to provide forward thrust to the aircraft. Pressurized hydrogen—for a hydrogen-fueled aircraft is lighter and less energy-dense than a similar volume of conventional liquid fuel, even when the pressurized hydrogen is stored at very high pressures of 5000 psi to 10,000 psi. The limited space on the aircraft to store hydrogen fuel for the fuel cells limits the range and utility of hydrogen fuel cell-powered aircraft. Storing hydrogen fuel in the tail boom provides additional fuel and additional range to the hydrogen fuel cell-powered aircraft.

For electrically-powered helicopters or compound aircraft, electric motors incorporated into the tail boom eliminate the need for a mechanical drive to power the tail rotor, such as a rotating shaft passing through the tail boom. At least a portion of the space within the tail boom that would otherwise be occupied by the rotating shaft and mechanical drive system may be occupied by the fuel tank structure and pressurized hydrogen.

The Invention is not limited to electrically-powered aircraft and also applies to a fuel tank structure to store hydrogen fuel that powers a turbine engine or internal combustion engine to either electrically or mechanically drive the main rotor(s) or tail rotor of the aircraft.

The fuel tank defining the structure of the tail boom or the discrete fuel tank contained within the structure of the tail boom may have any suitable shape. For example, the shape of the fuel tank can be generally conical to fit the aerodynamic shape of the tail boom. Alternatively, the fuel tank may be cylindrical to provide more storage volume than the generally conical fuel tank.

As an example, a compound aircraft may have a tail boom defined by a fuel tank extending in the aft direction from the fuselage. The forward end of the fuel tank is attached to and supported by the fuselage, as by nuts, bolts, studs or other fasteners. The aft end of the fuel tank defines flanges, bosses or other external attachment points and is attached to and supports a convertible thruster, drive system and empennage such as a rudder and elevator. The convertible thruster, drive system and empennage are attached to the external attachment points by any suitable mechanism, such as fasteners, adhesive, wires or struts. An electric motor drives the main rotor of the compound aircraft and a second electric motor drives the convertible thruster. The structural fuel tank provides pressurized hydrogen fuel to a fuel cell stack system. The fuel cell stack generates electricity to power the electric motors driving the main rotor and the convertible thruster.

The walls of the fuel tank may be composed of carbon fiber composite or other very strong material and with adequate thickness, fiber strength, fiber orientation, and polymer selection to withstand the very high pressure (for example 5,000 to 10,000 psi) of the hydrogen within the fuel tank and to withstand many cycles of filling and discharging the tank. Where the fuel tank structurally supports the empennage, tail rotor or convertible thruster, the fuel tank is also configured so that the walls of the fuel tank are able to transfer the weight, flight loads and crash loads to the fuselage from the tail boom, empennage, tail rotor, convertible thruster, and associated drive systems.

III. DESCRIPTION OF THE DRAWINGS

IV. DESCRIPTION OF AN EMBODIMENT

Figure 1:
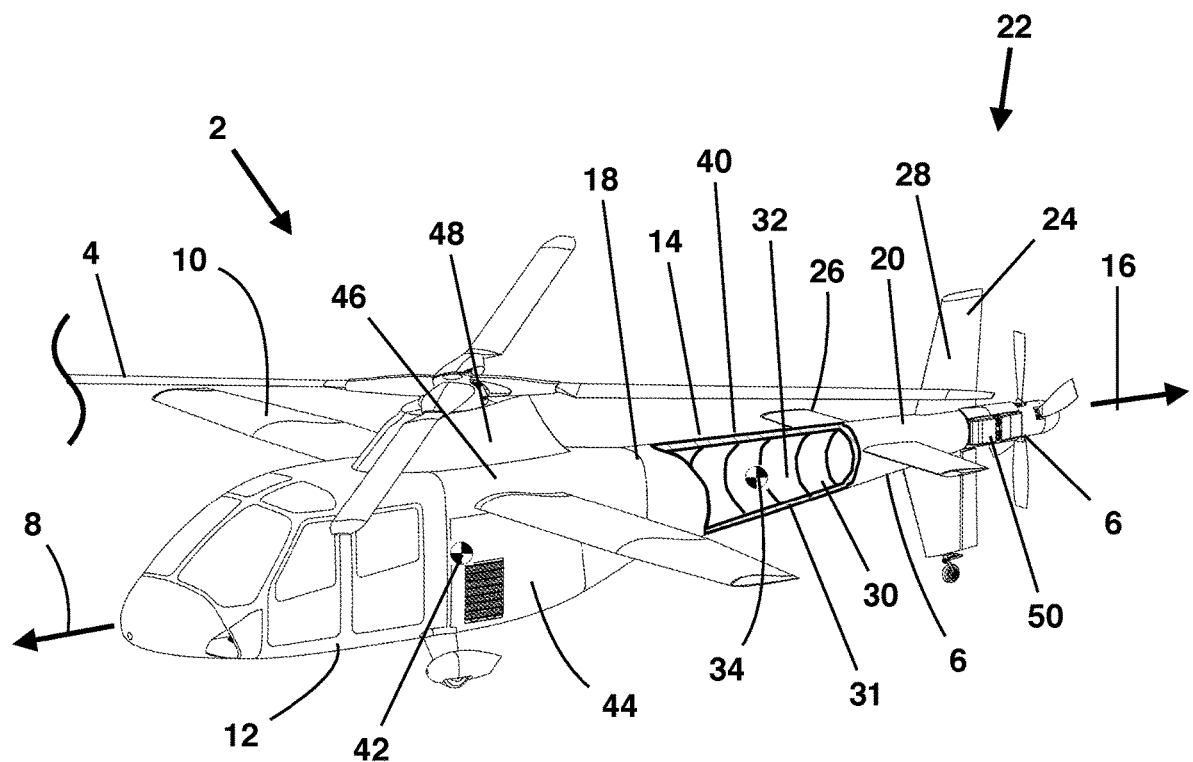
FIG. 1 is a perspective cutaway view of a thrust and lift compound aircraft having a fuel tank that defines the structure of the tail boom.

FIG. 1 is a perspective view of an example aircraft 2 of the Invention. The example aircraft 2 of FIG. 1 is a thrust and lift compound aircraft having a single main rotor 4 and a convertible thruster 6. The convertible thruster 6 has a thrust position, shown by FIG. 1, in which the axis of rotation of the convertible thruster 6 is parallel to the longitudinal axis of the aircraft 2. In the thrust position, the convertible thruster 6 propels the aircraft 2 in the forward direction 8. The convertible thruster 6 may swivels to a reaction position, not shown, in which the axis of rotation of the convertible thruster 6 is normal to the longitudinal axis of the aircraft 2 to balance the main rotor 4 torque. The main rotor 4 provides lift during hover and low speed flight. A wing 10 provides lift during higher speed flight in the forward direction 8.

The compound aircraft 2 includes a fuselage 12 and a tail boom 14 that extends in the aft direction 16 from the fuselage 12. The tail boom 14 has a tail boom first end 18 that attaches to the fuselage 12 and a tail boom second end 20 that attaches to and supports an empennage 24, a propeller, a tail rotor, a convertible thruster 6, a ducted fan or a vectored thruster (collectively 22). In the example of FIG. 1, the tail boom second end 20 supports empennage 24 and the convertible thruster 6. The empennage 24 may comprise a horizontal stabilizer 26, vertical stabilizer 28, elevator, rudder, stabilator, or other control surface.

FIG. 1 shows the tail boom 14 in partial cutaway to reveal a fuel tank 30 located within the tail boom 14. The fuel tank 30 has a fuel tank wall 31. The fuel tank 30 may define the structure of the tail boom 14 and may define some or all of the outer mold line (OML) of the tail boom 14. As described below, the fuel tank wall 31 may provide the structure to support the empennage 24 and the convertible thruster 6 and drive system.

Figure 2:
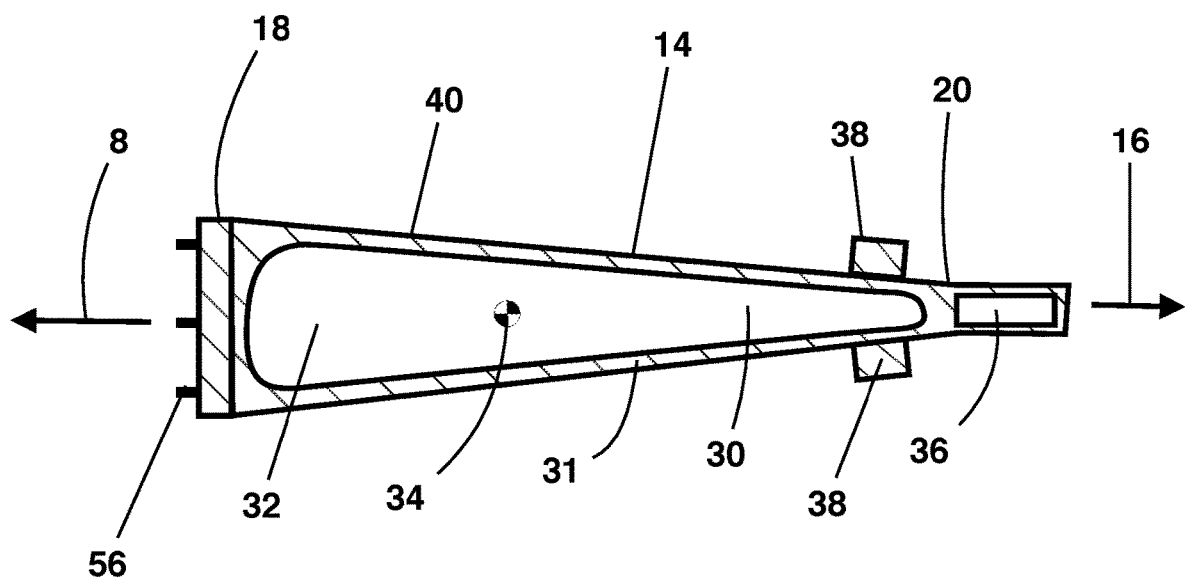
FIG. 2 is a top sectional view of the fuel tank shown in FIG. 1.

The fuel tank 30 is configured to contain pressurized hydrogen 32 in the form of pressurized hydrogen gas or cryogenic liquid hydrogen. The pressurized hydrogen 32 may be compressed to 5,000 psi to 10,000 psi and the fuel tank wall 31 must be very strong to contain the very high pressure of the pressurized hydrogen 32 and to tolerate many cycles of filling and emptying of the fuel tank 30. As shown by FIG. 2, the very strong fuel tank wall 31 may provide the structure of the tail boom 14 to support the empennage 24, propeller, tail rotor, convertible thruster 6, ducted fan or vectored thruster that may be attached to the tail boom second end 20.

FIG. 2 is a top sectional view of the fuel tank 30 and fuel tank wall 31 of FIG. 1. As described above, the fuel tank wall 31 is composed of very strong materials able to withstand very high pressures of pressurized hydrogen 32 within the fuel tank 30 and able to withstand many cycles of filling and discharging the fuel tank 30. The fuel tank wall 31 also may be composed of materials that are adequately strong to transfer the weight, imposed flight loads and crash loads on the tail boom 14, empennage 24, propeller, tail rotor, convertible thruster 6, ducted fan, vectored thruster, or drive system to the fuselage 12, all as described above. Bolts, nuts, studs, clamps, mating members, or other fasteners 56 may attach the fuel tank 30 to the fuselage 12. Alternatively, the fuel tank 30 may be bonded to the fuselage 12 or unitary with the structure of the fuselage 12.

From FIG. 2, an end tube 34 integral to and unitary with the fuel tank 30 may support the convertible thruster 6 and drive system of the example of FIGS. 1 and 2. The horizontal stabilizer 26 may be attach to and are supported by bosses 38 defined by the fuel tank 30. The vertical stabilizer 28 may be attach to similar bosses 28, not shown by the section view of FIG. 2. The horizontal and vertical stabilizers 26, 28 may attach to the bosses 38 using nuts, bolts, studs or other fasteners. Alternatively, the horizontal and vertical stabilizers 26, 28 may be bonded to or integral with the fuel tank 30. Any of the empennage 24, propeller, tail rotor, convertible thruster 6, ducted fan or vectored thruster, or drive systems for any of those systems, may be attached to and supported by the tail boom second end 20 of the tail boom 14, as defined by the fuel tank 30.

From FIGS. 1 and 2, the fuel tank wall 31 may define some or all of the outer mold line (OML) 40 of the tail boom 14; that is, the outer surface of the fuel tank 30 may be the outer surface of all or part of the tail boom 14.

From FIG. 1, the aircraft 2 has an aircraft center of gravity 42 when the aircraft 2 is flying through the air. The location of the aircraft center of gravity 42 and the change in the location of the aircraft center of gravity 42 as fuel is consumed during flight are crucial to the successful operation of the aircraft 2. The fuel tank center of gravity 34 is spaced apart from the aircraft center of lift because the fuel tank 30 is located in the tail boom 14. As a result, when the fuel tank 30 in the tail boom 14 is filled with fuel the aircraft center of gravity 42 shifts in the aft direction 16. The aircraft center of gravity 42, including the mass of the fuel in the filled fuel tank 30, must be adequately close to the center of lift of the aircraft 2 so that the aircraft 2 maintains adequate control authority to maintain coordinated flight. Otherwise, the aircraft 2 is uncontrollable at the outset and cannot take off and fly successfully. As fuel in the fuel tank 30 is consumed during flight, the mass of the fuel is reduced and the aircraft center of gravity 42 shifts in the forward direction 8. The change in the aircraft center of gravity 42 must be adequately small that aircraft 2 has adequate control authority to maintain coordinated flight. Otherwise, the aircraft 2 will become uncontrollable during flight.

Because the pressurized hydrogen 32 fuel in the fuel tank 30 is relatively light in weight, filling the fuel tank 30 and consumption of the pressurized hydrogen 32 has a relatively small effect the location of the aircraft center of gravity 42. The location and capacity of the fuel tank 30 may be selected so that if the fuel tank 30 were filled with a conventional liquid fuel rather than pressurized hydrogen 32, then the aircraft 2 would not have adequate control authority for sustained coordinated flight both when the fuel tank 30 was filled with conventional liquid fuel and when the fuel tank 30 was drained of conventional liquid fuel. The use of pressurized hydrogen 32 for fuel therefore provides opportunities for location of the fuel tank 30 in the tail boom 14 that do not exist for conventional liquid fuels. The term 'conventional liquid fuel' means jet fuel, kerosene, diesel fuel or gasoline and does not mean cryogenic liquid hydrogen. The term 'pressurized hydrogen 32' means hydrogen gas that is compressed to 5000 psi or more and also means cryogenic liquid hydrogen. The term 'control authority,' means the moments that the control surfaces, effectors, actuators or rotor(s) of the aircraft 2 can apply to the fuselage 12 to achieve a commanded flight condition. As used herein, 'coordinated flight' means that an aircraft 2 has adequate control authority for straight and level flight at standard conditions without slippage of the aircraft 2 as it moves through the air.

The example aircraft 2 of FIG. 1 is electrically powered. A fuel cell stack 44 receives pressurized hydrogen 32 from the fuel tank 30 and generates electricity. The electricity powers an electric motor 46 that drives the main rotor 4 through a rotor transmission 48. A separate convertible thruster motor 50 powers the convertible thruster 6. In the example of FIG. 1, a mechanical drive system, such as a system of rotating shafts, does not pass through the tail boom 14.

Figure 3:
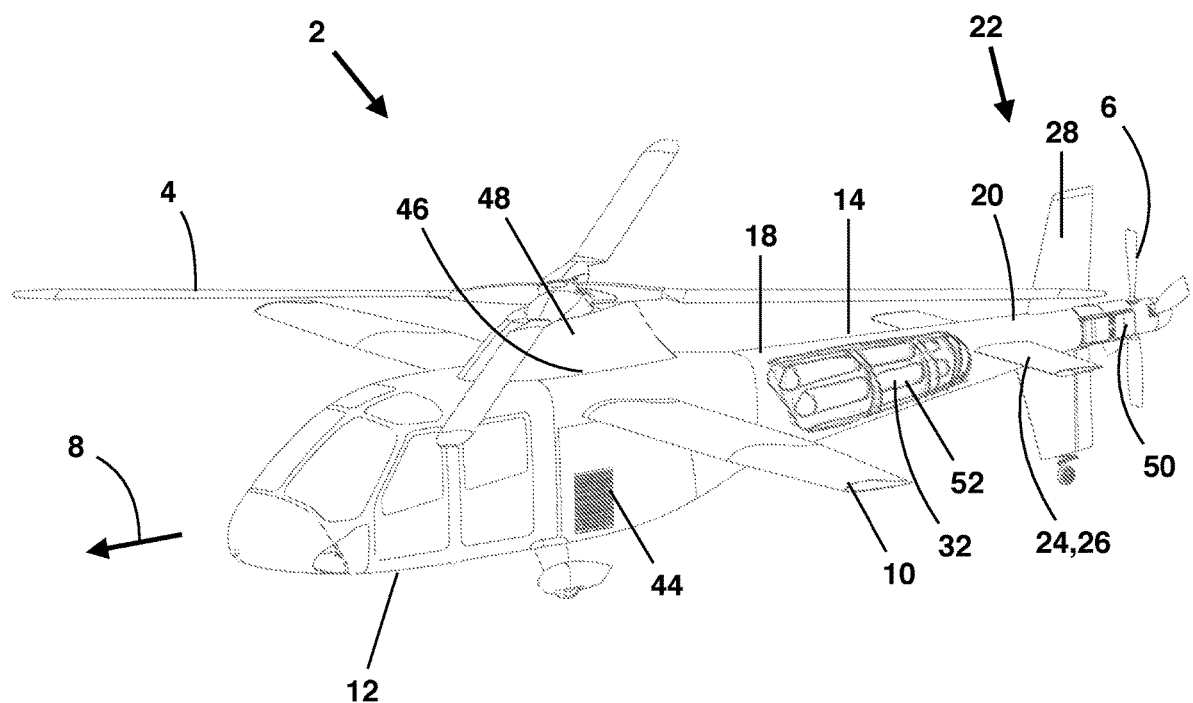
FIG. 3 is a perspective cutaway view of a thrust and lift compound aircraft having discrete fuel tanks contained within the structure of the tail boom.
Figure 4:
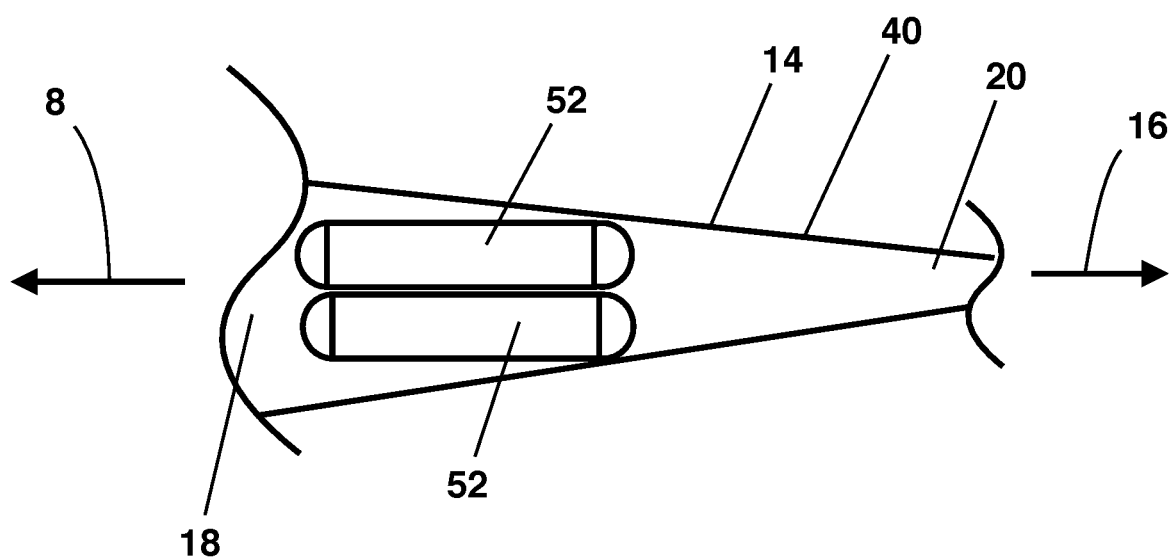
FIG. 4 is a top sectional of a tail boom having discrete fuel tanks contained within the structure of the tail boom.

FIGS. 3 and 4 show an example aircraft 2 that includes separate and discrete tanks 52 located in the tail boom 14. FIG. 3 is a perspective cutaway view of the aircraft 2 while FIG. 4 is a detail section top view of the tail boom 14 showing the separate and discrete tanks 52. Unlike the fuel tank 30 of FIG. 1, the separate and discrete tanks 52 of FIG. 3 do not define the structure of the tail boom 14 and do not define the OML 40 of the tail boom 14. The separate and discrete tanks 52 also do not support the empennage 24 or the convertible thruster 6 or drive system. In all other respects, the separate and discrete tanks 52 operate in the same manner as the fuel tank 30 described above relating to FIGS. 1 and 2.

While the separate and discrete fuel tanks 52 of FIGS. 3 and 4 do not structurally support the empennage 22 or convertible thruster 6, the separate and discrete fuel tanks 52 contained within the tail boom 14 may provide structural support to the empennage 22, convertible thruster 6 or tail rotor, including supporting flight and crash loads of the empennage 22, convertible thruster 6 or tail rotor.

Figure 5:
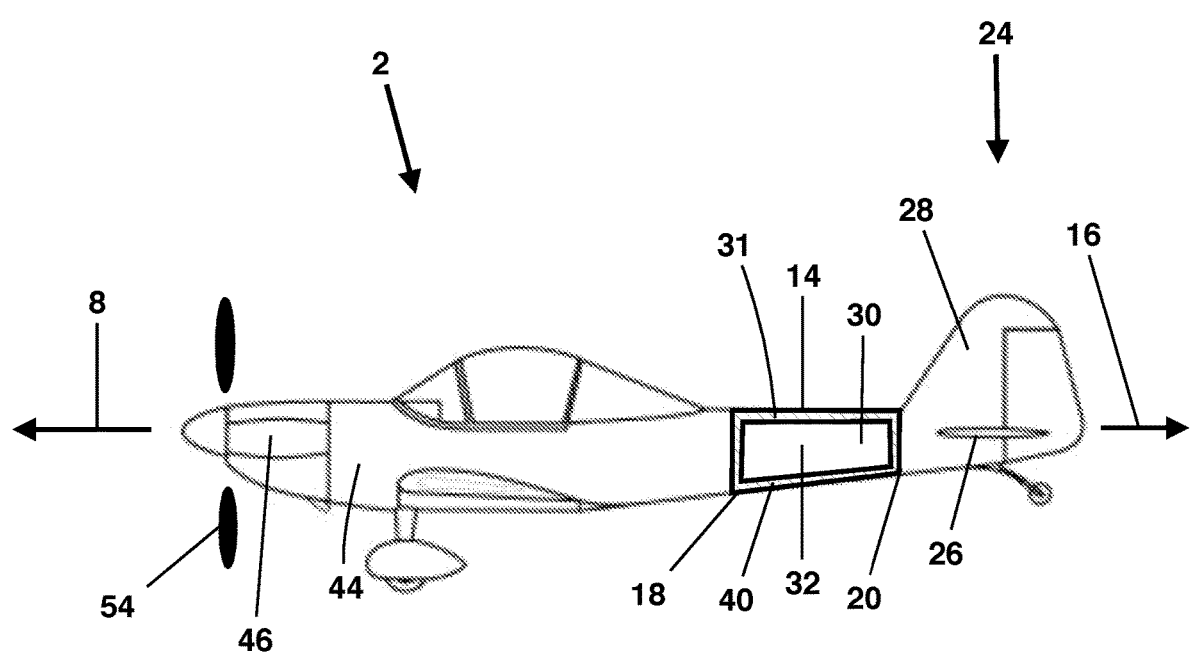
FIG. 5 is a side sectional view of a fixed wing aircraft having a fuel tank that defines the structure of the tail boom.

FIG. 5 illustrates that the aircraft 2 may be a fixed-wing aircraft 2 and the fuel tank 30 may connect to the fuselage 12 and the empennage 24 of the fixed wing aircraft 2. The aircraft 2 of FIG. 5 is electrically powered with a fuel cell stack 44 powered by pressurized hydrogen 32 in the fuel tank 30. The resulting electricity drives an electric motor 46 that powers a propeller 54. The fuel tank 30 of FIG. 5 supports the tail boom 14 and empennage 24 and may define the OML 40 of the tail boom 14. As for a rotary wing aircraft, one or more discrete fuel tanks 52 may be contained within the tail boom 14 and may structurally support the empennage 24, including flight and crash loads.

The fuel tank 30 may have a safety valve facing outboard to relieve overpressure. If the fuel tank 30 comprises separate and discrete tanks 52 supported by a separate tail boom 14 structure, the separate tail boom 14 structure may have an openable door valve to relieve a gas leak when detected by sensors.

Figure 6:
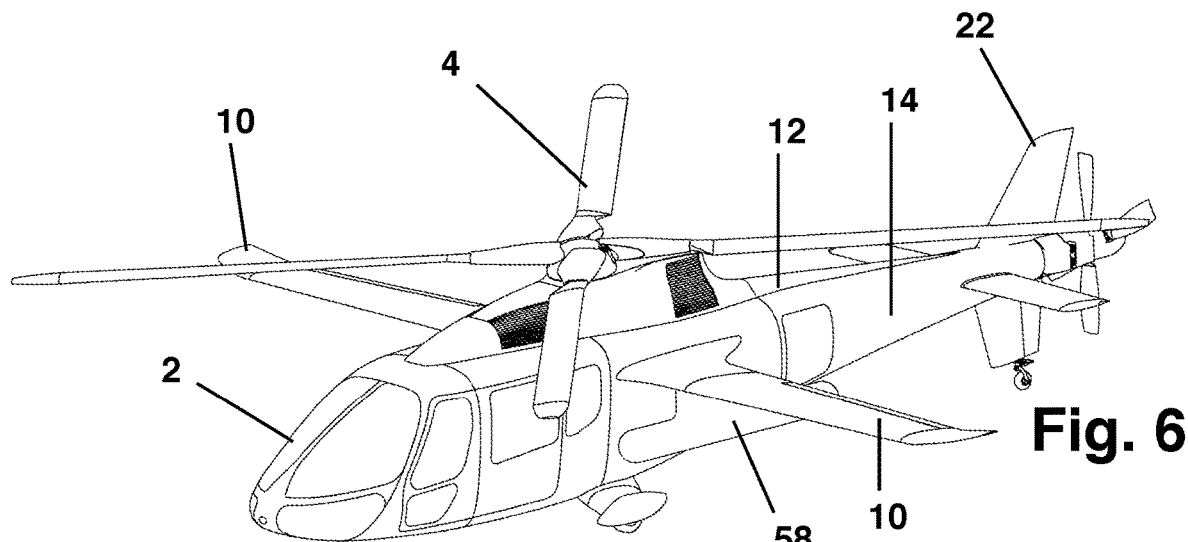
FIG. 6 is a perspective view of compound aircraft with a wing tank.
Figure 7:
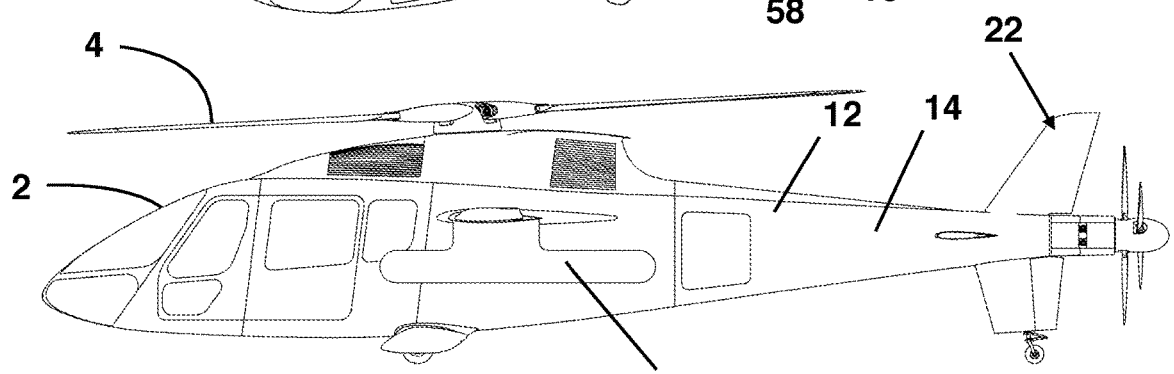
FIG. 7 is a side view of a compound aircraft with a wing tank.
Figure 8:
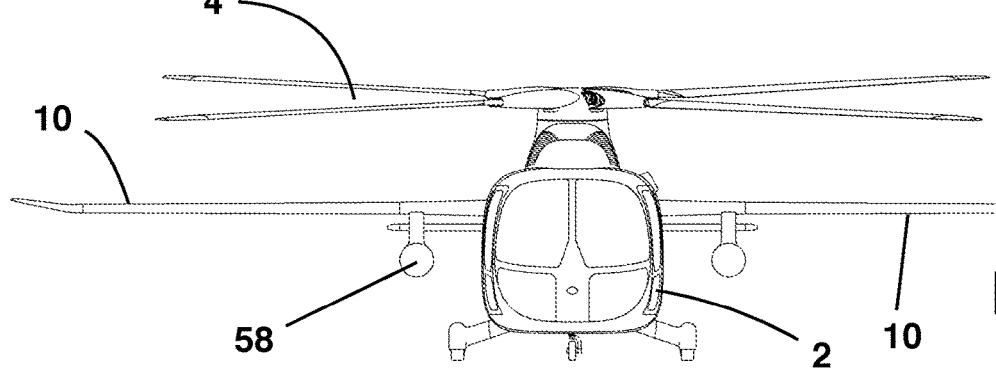
FIG. 8 is a front view of a compound aircraft with wing tanks.

FIGS. 6, 7 and 8 are a perspective view, a side view and a front view of a compound aircraft 2 having a wing 10, a main rotor 4 and a fuselage 12. The compound aircraft 2 may have wing tanks 58 suspended from each wing 10 to contain pressurized hydrogen 32. The wing tanks 58 may supplement pressurized hydrogen 32 contain within the tail boom 14, as described above, or may provide pressurized hydrogen 32 in lieu of pressurized hydrogen 32 contained within the tail boom 14. Although FIG. 8 shows wing tanks 58 below both wings 10, a wing tank 58 may be located on one wing 10 but not the opposing wing 10 because of the light weight of the pressurized hydrogen 32.

For the purposes of these documents, elements labeled in the drawings or at one location in the specification with the same element number and name have the same meaning as the same element number and name appearing on another drawing or at another location in the specification unless the context requires otherwise.

The following is a list of numbered elements from the drawings and specification.

An aircraft 2
Main rotor 4
Convertible thruster 6
Forward direction 8
Wing 10
Fuselage 12
Tail boom 14
Aft direction 16
Tail boom first end 18
Tail boom second end 20
an empennage, a propeller, a tail rotor, a convertible thruster, a ducted fan or a vectored thruster (collectively 22)
Empennage 24
Horizontal stabilizer 26
Vertical stabilizer 28
Fuel tank 30
Fuel tank wall 31
Pressurized hydrogen 32
End tube 34
Fuel tank center of gravity 34
End tube 36
Bosses 38
Outer mold line (OML) 40
Aircraft center of gravity 42
Fuel cell stack 44
an electrical motor 46
Rotor transmission 48
Convertible thruster motor 50
Separate and discrete tanks 52
Propeller 54
Fasteners 56
Wing tank 58

What is claimed is:

1. An aircraft, the aircraft comprising:
a) a fuselage, the fuselage defining a forward direction and an aft direction;
b) a tail boom containing a fuel tank, the tail boom having a tail boom first end and a tail boom second end, the tail boom first end being attached to the fuselage, the tail boom second end extending in the aft direction from the fuselage, the tail boom second end supporting an empennage, a tail rotor, a propeller, a convertible thruster, a ducted fan or a vectored thruster, the fuel tank being configured to contain a pressurized hydrogen, wherein the fuel tank includes a fuel tank wall, the fuel tank wall being configured to contain the pressurized hydrogen and being in contact with the pressurized hydrogen during flight of the aircraft, the fuel tank wall being attached to the fuselage and being attached to the empennage, the tail rotor, the propeller, the convertible thruster, the ducted fan or the vectored thruster, the fuel tank wall having a configuration to support the tail boom second end and to support the empennage, the tail rotor, the propeller, the convertible thruster, the ducted fan or the vectored thruster;
c) a main rotor or a propeller configured to provide aerodynamic lift to the aircraft or to propel the aircraft through the air;
d) a fuel cell stack, the fuel cell stack being configured to use the pressurized hydrogen contained within the fuel tank to generate an electrical power;
e) an electrical motor, the electrical motor being configured to rotate the main rotor or the propeller to generate aerodynamic lift, wherein the aircraft has an aircraft center of lift and the fuel tank having a fuel tank center of gravity, the fuel tank center of gravity being located aft of the aircraft center of lift, the aircraft center of lift and the fuel tank center of gravity having a spaced-apart relation such that the aircraft would not have an adequate control authority to maintain a coordinated flight when the fuel tank was full of a conventional liquid fuel, but that the aircraft would have the adequate control authority to maintain the coordinated flight when the fuel tank was both full of the pressurized hydrogen.

2. The aircraft of claim 1 wherein the configuration of the fuel tank to support the tail boom second end comprises: the fuel tank wall defines some or all of an outer mold line of the tail boom.

3. The aircraft of claim 1 wherein the configuration of the fuel tank to support the tail boom second end further comprises: the fuel tank wall defines the tail boom first end and the tail boom second end.

4. The aircraft of claim 3 wherein the fuel tank wall is sufficiently stiff and strong to convey design flight and crash loads of the empennage, propeller, tail rotor, convertible thruster, ducted fan or vectored thruster to the fuselage.

5. The aircraft of claim 1 wherein the aircraft is a rotary-wing aircraft, the aircraft further comprising:
a) one or more main rotors configured to support the rotary-wing aircraft in flight;
b) the empennage, the tail rotor, the propeller, the convertible thruster, the ducted fan or the vectored thruster being configured to balance a torque of the one or more main rotors, the configuration of the fuel tank to support the empennage, the tail rotor, the propeller, the convertible thruster, the ducted fan or the vectored thruster being that the fuel tank wall has a sufficient strength and a sufficient stiffness in flexure and torsion to support the empennage, the tail rotor, the propeller, the convertible thruster, the ducted fan or the vectored thruster during flight of the aircraft.

6. The aircraft of claim 1 wherein the aircraft is a fixed-wing aircraft, the configuration of the fuel tank to support the empennage being that the fuel tank wall has a sufficient strength and a sufficient stiffness in flexure and torsion to support the empennage during flight of the aircraft.

7. The aircraft of claim 6 wherein the empennage comprises: a horizontal stabilizer, an elevator, a vertical stabilizer, a rudder, a stabilator, or a V-tail.

8. An aircraft, the aircraft comprising:
a) a fuselage, the fuselage defining a forward direction and an aft direction;
b) a tail boom containing a fuel tank, the tail boom having a tail boom first end and a tail boom second end, the tail boom first end being attached to the fuselage, the tail boom second end extending in the aft direction from the fuselage, the tail boom second end supporting an empennage, a tail rotor, a propeller, a convertible thruster, a ducted fan or a vectored thruster, the fuel tank being configured to contain a pressurized hydrogen, wherein, the aircraft has an aircraft center of lift and the fuel tank having a fuel tank center of gravity, the fuel tank center of gravity being located aft of the aircraft center of lift, the aircraft center of lift and the fuel tank center of gravity having a spaced-apart relation such that the aircraft would not have an adequate control authority to maintain a coordinated flight when the fuel tank was full of a conventional liquid fuel a, but that the aircraft would have the adequate control authority to maintain the coordinated flight when the fuel tank was full of the pressurized hydrogen;
c) a main rotor or a propeller configured to provide aerodynamic lift to the aircraft or to propel the aircraft through the air;
d) a fuel cell stack, the fuel cell stack being configured to use the pressurized hydrogen contained within the fuel tank to generate an electrical power; and
e) an electrical motor, the electrical motor being configured to rotate the main rotor or the propeller to generate aerodynamic lift.

9. The aircraft of claim 8 wherein the conventional liquid fuel is a jet fuel, a kerosene, a diesel fuel or a gasoline and is not a cryogenic liquid hydrogen and wherein the pressurized hydrogen is hydrogen gas at a pressure of 5,000 psi or more or is cryogenic liquid hydrogen.

10. The aircraft of claim 9 wherein the fuel tank has a fuel tank structure configured to contain the fuel and the tail boom has a tail boom structure, the fuel tank structure is distinct from the tail boom structure.

11. The aircraft of claim 10 wherein the fuel tank is a one of a plurality of the fuel tanks enclosed within the tail boom, the plurality of fuel tanks in combination defining the fuel tank center of gravity.

12. The aircraft of claim 9 wherein the fuel tank includes a fuel tank wall, the fuel tank wall being configured to contain the pressurized hydrogen and being in contact with the pressurized hydrogen during flight of the aircraft, the fuel tank defining the tail boom first end and defining the tail boom second end, the fuel tank being attached to the fuselage at the tail boom first end, the empennage, the tail rotor, the propeller, the convertible thruster, the ducted fan or the vectored thruster being attached to the fuel tank at the tail boom second end, the fuel tank wall being sufficiently stiff and strong to support the empennage, the tail rotor, the propeller, the convertible thruster, the ducted fan or the vectored thruster.

13. The aircraft of claim 8 wherein the aircraft is a rotary-wing aircraft, the aircraft further comprising:
a) one or more main rotors configured to support the rotary-wing aircraft in flight;
b) the empennage, the tail rotor, the propeller, the convertible thruster, the ducted fan or the vectored thruster being configured to balance a torque of the one or more main rotors, the fuel tank having a configuration to support the empennage, the tail rotor, the propeller, the convertible thruster, the ducted fan or the vectored thruster during flight of the aircraft.

14. The aircraft of claim 13 wherein the configuration of the fuel tank to support the empennage, the tail rotor, the propeller, the convertible thruster, the ducted fan or the vectored thruster comprising: the fuel tank defining the tail boom first end and tail boom second end, the fuel tank attaching the empennage, the tail rotor, the propeller, the convertible thruster, the ducted fan or the vectored thruster to the fuselage, the fuel tank having a strength and a stiffness in flexure and torsion, the strength and the stiffness of the fuel tank being sufficient so that the fuel tank transmits to the fuselage flight loads and crash loads of the empennage, the tail rotor, the propeller, the convertible thruster, the ducted fan or the vectored thruster.

15. The aircraft of claim 8 wherein the aircraft is a fixed-wing aircraft and wherein the fuel tank has a configuration to support the empennage, the tail rotor, the propeller, the convertible thruster, the ducted fan or the vectored thruster attached to the tail boom second end.

16. The aircraft of claim 15 wherein the configuration of the fuel tank to support the empennage, the tail rotor, the propeller, the convertible thruster, the ducted fan or the vectored thruster comprising: the fuel tank having a fuel tank wall, the fuel tank wall having a strength and a stiffness in flexure and torsion, the strength and the stiffness of the fuel tank wall being sufficient so that the fuel tank transmits to the fuselage flight loads and crash loads of the empennage, the tail rotor, the propeller, the convertible thruster, the ducted fan or the vectored thruster.

17. The aircraft of claim 16, wherein the empennage comprises: a horizontal stabilizer, an elevator, a vertical stabilizer, a rudder, a stabilator, or a V-tail.

\* \* \* \* \*